United States Patent
Von Borany et al.

(10) Patent No.: US 11,513,790 B2
(45) Date of Patent: Nov. 29, 2022

(54) MEMORY OPTIMIZED BLOCK-BASED DIFFERENTIAL UPDATE ALGORITHM

(71) Applicant: SHENZHEN GOODIX TECHNOLOGY CO., LTD., Shenzhen (CN)

(72) Inventors: Andreas Von Borany, Glashütte (DE); Martin Fröhlich, Dresden (DE)

(73) Assignee: SHENZHEN GOODIX TECHNOLOGY CO., LTD.

( * ) Notice: Subject to any disclaimer, the term of this patent is extended or adjusted under 35 U.S.C. 154(b) by 185 days.

(21) Appl. No.: 17/029,032

(22) Filed: Sep. 22, 2020

(65) Prior Publication Data
US 2021/0004223 A1    Jan. 7, 2021

Related U.S. Application Data

(63) Continuation of application No. PCT/EP2019/077596, filed on Oct. 11, 2019.

(30) Foreign Application Priority Data

Oct. 30, 2018  (EP) .................................... 18203273

(51) Int. Cl.
*G06F 8/658*     (2018.01)
*G06F 8/654*     (2018.01)

(52) U.S. Cl.
CPC .............. *G06F 8/658* (2018.02); *G06F 8/654* (2018.02)

(58) Field of Classification Search
CPC .................................. G06F 8/654; G06F 8/658
(Continued)

(56) References Cited

U.S. PATENT DOCUMENTS

2004/0210551 A1* 10/2004 Jones et al. ............. G06F 8/658
2011/0119662 A1*  5/2011 Chen et al. ............... G06F 8/65
                                                            717/168
(Continued)

OTHER PUBLICATIONS

Jinsik Kim et al: "Remote progressive firmware update for flash-based networked embedded systems", Proceeding of the 2009 ACM/IEEE International Symposium on Low Power Electronics and Design, Aug. 19-21, 2009, San Francisco, CA, USA, ACM Press, New York, NY, Aug. 19, 2009, XP58210704A, 6 pages. (Year: 2009).*

(Continued)

*Primary Examiner* — Wei Y Zhen
*Assistant Examiner* — Mohammed N Huda
(74) *Attorney, Agent, or Firm* — Emerson, Thomson & Bennett, LLC; Roger D. Emerson; Peter R. Detorre

(57) ABSTRACT

A method for updating a firmware image comprises: — dividing a new firmware image into blocks $1^* \ldots n^* \ldots N^*$, wherein $n^*$ and $N^*$ are natural numbers, and wherein the size S is determined empirically before updating the firmware image, a) matching a first block $1^*$ of the new firmware image against the full old firmware image using a binary differential and patching algorithm by b) creating a first block patch of the new and old firmware image according to said first block $1^*$ of the new firmware image and the blocks 1 to M of the old firmware image, and repeating steps a) and b) wherein the consecutive repetitions are performed using only the blocks of the old firmware image not being processed yet, wherein the old binary firmware image is updated on a block-by-block basis, and wherein the currently processed block patch n is tracked.

14 Claims, 5 Drawing Sheets

(58) Field of Classification Search
USPC .......................................................... 717/168
See application file for complete search history.

(56) References Cited

U.S. PATENT DOCUMENTS

2017/0046152 A1* 2/2017 Shih et al. .............. G06F 8/654
2018/0039663 A1* 2/2018 Sachdev ............. G06F 16/2272

OTHER PUBLICATIONS

Teraoka Hidetoshi et al: "Incremental update method for resource constrained in vehicle ECUs," 2016 IEEE 5th Global Conference on Consumer Electronics, IEEE, Oct. 11, 2016, XP33032294A, 2 pages.

Carl von Platen et al: "Feedback linking", Language, Compilers, and Tool Support for Embedded Systems, ACM, 2 Penn Plaza, Suite 701 New York NY 10121-0701 USA, Jun. 14, 2006, XP58135217A, 10 pages.

Jinsik Kim et al: "Remote progressive firmware update for flash-based networked embedded systems", Proceeding of the 2009 ACM/IEEE International Symposium on Low Power Electronics and Design, Aug. 19-21, 2009, San Francisco, CA, USA, ACM Press, New York, NY, Aug. 19, 2009, XP58210704A, 6 pages.

Colin Percival: "Matching with Mismatches and Assorted Application", PhD Thesis of Wadham College, University of Oxford, Jan. 1, 2006, retrieved from the Internet URL: https://www.daemonology.net/papers/thesis.pdf, XP55577858A, 82 pages.

Colin Percival: "Nave Differences of Executable Code", Article of Computing Lab of Oxford University, Jan. 1, 2003, retrieved from the Internet URL: https://www.daemonology.net/papers/bsdiff.pdf, XP55577860A, 3 pages.

* cited by examiner

MEMORY OPTIMIZED BLOCK-BASED DIFFERENTIAL UPDATE ALGORITHM

CROSS-REFERENCE TO RELATED APPLICATIONS

The present application is a continuation of PCT application No. PCT/EP2019/077596, filed on Oct. 11, 2019, and entitled "Memory Optimized Block-based Differential Update Algorithm", which claims the priority of the European application No. EP 18203273.0, filed on Oct. 30, 2018, and entitled "Memory Optimized Block-based Differential Update Algorithm," both of which are hereby incorporated by reference in their entireties.

TECHNICAL FIELD

The disclosure relates to a method for updating a firmware image of an embedded device.

BACKGROUND

There are different approaches available to update firmware of embedded devices, e.g. full firmware image update, patching of binary files or patching based on disassembly.

The disclosure is based on known binary patching algorithm BSDIFF based on the PHD thesis 'Naive Differences of Executable Code' by Colin Percival [http://www.daemonology.net/papers/bsdiff.pdf], but can be applied to any other binary patching algorithm as well.

Updates for embedded firmware are getting more and more important due to the importance of distributing security relevant updates. This update process must be fail-safe due to its nature of updating the firmware itself but should be also memory efficient to save resources.

Current approaches require a large amount of additional memory compared to the size of the executable code. Usually this more than doubles the required memory (firmware image+area for the update additional) to be fail-safe.

SUMMARY

FIG. 1 shows the procedures for updating a non-persistent memory and a persistent memory in comparison, wherein additional or optional memory space is needed for a fail-safe update. Binary patching algorithms such as BSDIFF itself address the topic of minimizing the area needed for the update patch (usually requires approx. 10% of the full image), wherein the topic of reducing the memory area for the updated firmware (FW) image is not addressed, because the patching algorithm still operates on a full binary firmware image and creates a patch file for the whole binary. This leads to the effect that the memory for a full FW image is additionally needed to update the firmware. This high memory demand leads to higher power consumption, shorter battery life-time, bigger chip area and higher costs of the embedded devices.

In Teraoka Hidetishi et al. "Incremental update method for resource-constrained in-vehicle ECUs", 2016 IEEE 5$^{th}$ Global Conference on consumer electronics, IEEE 11 Oct. 2016, pages 1-2, XP033032294 a method using a BSDiff algorithm is described. The BSDiff algorithm generates a patch file by matching a new and an old program on a block-by-block basis, wherein the first block of the old program is compared with the first block of the new program, meaning a new block is compared with the related area of the old program. The disadvantage is that the generated DIFF files are relatively large if the compared blocks have large differences and hardly any match is found.

It is therefore an object of the disclosure to find a method which is able to update firmware in a fail-safe way without needing huge additional memory space, hence to find a memory optimized method to reduce memory size and hence to reduce the chip area and costs per embedded device.

The object of the disclosure will be solved by a method for updating a firmware image of an embedded device, the method comprising the following steps:

dividing a new firmware image into blocks 1* ... n* ... N* of size S, wherein n* and N* are natural numbers, and wherein the size S of the blocks is determined empirically before updating the firmware image, considering an old firmware image of the embedded device by dividing the old firmware image into blocks 1 ... m ... M of size S, wherein m and M are natural numbers, a) matching a first block 1* of the new firmware image against the full old firmware image using a binary differential and patching algorithm by b) creating a first block patch 1 of the new and old firmware image according to said first block 1* of the new firmware image and the blocks 1 to M of the old firmware image and storing the first block patch in a patch file, wherein repeating steps a) and b) for matching against all blocks of the old firmware image not being processed yet and creating block patches 1 ... n ... N until all blocks N* and M are processed, respectively, and wherein the old binary firmware image of the embedded device is updated on a block-by-block basis, by application of the corresponding block patch 1 ... n ... N, wherein n and N are natural numbers, and wherein a currently processed block patch n is tracked for ensuring that said block patch n is not applied twice to an updated part of the old firmware image.

The idea is to divide the new firmware image into blocks, e.g. an integer multiple of the flash page size, and to create separate block patches based on a binary differential and patching algorithm, e.g. BSDIFF, for each of the blocks. The corresponding block patch for each block is saved accordingly in a jointly resulting patch file. The size S of the blocks is determined empirically by simulation on a PC before updating the firmware image. Criterions for choosing the block size S could be for example the flash page size or the required overhead of the diff file block header. The smaller the size S of the blocks has been chosen the higher is the probability to find a match. This allows on the embedded device to update the binary image on a block-by-block basis, which reduces the additional memory demand to the size of such a block and the size of the patch file for updating the blocks.

The new firmware image is divided into N* blocks, hence the new firmware image comprises the blocks 1*, 2*, ..., n*, ..., N*−1, N*, wherein n* can be every natural number between 1* and N*.

The old firmware image of the embedded device comprises also blocks 1, 2, ..., m, ..., M, wherein m can be every natural number between 1 and M.

The block size S of the blocks N* of the new firmware image and blocks M of the old firmware image are equal.

The block patches created by the inventive comparison between the old and new firmware image, which is described later, are numbered with 1, 2, ..., n, ..., N−1, N. The sum of all block patches in a patch file comprises the firmware data which is new in the new firmware in comparison to the old firmware image. A single block patch comprises the difference between two compared firmware blocks, respectively or the patch file comprises the difference between two compared firmwares. So, the created block patch and finally the created patch file is understood as the DIFF-file as an output of the differential and patching algorithm that is used.

The vendor of a device typically has the information about the firmware currently present on a device, hence the old firmware image, as well as the firmware update to be distributed, hence the new firmware image. On embedded devices this usually is a binary image of the firmware. With the two binary images the vendor can create a patch file using standard binary difference algorithms such as BSDIFF. Also other binary difference algorithms are applicable. The new approach of the disclosure is to do said patch file creation on a block-by-block basis in an optimized fashion. Firstly, the new firmware image is divided into blocks with a block size S described above. The first block 1* of the new firmware image is matched against the full old firmware image comprising the blocks 1 to M of the embedded device using a binary difference algorithm such as BSDIFF and a corresponding block patch 1 for the first block is created. The same process is repeated continuously for the remaining blocks 2* to N* of the new firmware image of the embedded device with the exception that only the blocks of the old firmware image not being processed yet shall be considered for creating the corresponding block patches 2 to N using the binary differential algorithm. This means for example that the block patch for block 2* of the new firmware image is created by comparing block 2* of the new firmware image with the blocks 2 to M old firmware image ignoring the first block 1 of the old firmware image, because this block was already processed for the first block patch.

Patching the old firmware into the new one works than simply by applying the patch file to the actual considered old firmware according to the given binary difference and patching algorithm either after each block patch creation or finally with the fully generated patch file. This means the block patches which are stored in the patch file are applied for an update. The patch file is just something like a container. Keeping track of the currently processed block patch within the update status area is mandatory to ensure that a block patch or part of the patch file is not applied twice to an updated area of the firmware.

The advantage of matching a block of the new firmware image against the full old firmware image or more specifically with the blocks of the old firmware image that has not yet been processed is that the matching rate is much higher because the probability of finding a match is greater than when comparing only block-by-block, e.g. meaning block 1* of the new firmware image is only compared with block 1 of the old firmware image and block 2* of the new firmware image is only compared with block 2 of the old firmware image and block n* of the new firmware image is only compared with block m* of the old firmware image (n* and m* have the same position in the block structure) and so on.

In an embodiment of the inventive method, an updated block n according to the block patch n is stored in place corresponding to the block m of the old binary firmware image of the embedded device. Hence the position of the blocks n* and m are equal.

In an embodiment of the inventive method, the size S of the block n* of the new firmware image is chosen as an integer multiple of a memory page size, wherein n* is a natural number between 1 and N*. S can also be chosen as an integer multiple of the flash page or sector size. Flash memories are organized in sectors and pages. Usually it is only possible to erase full sectors/pages. Furthermore, an erase must be done before a flash memory can be written byte-by-byte, wherein writing basically means clearing certain bits; hence a 1 to 0 transition is possible by write but not vice versa. Therefore, the natural approach here is to select a block size S which is a multiple of the sector/page size to have an aligned erase of the memory.

For other memory types, e.g. EEPROM, this is not a must have because single bytes can be erased or it is even possible to simply write each byte, a 0 to 1 transition is also possible. Anyways a fixed block size S eases of course the processing.

In another embodiment of the inventive method, if the last block N* of the new firmware image has another size than size S, said last block N* is padded using a predefined pattern, especially 0x00 or 0xFF. It is usually the case, that the last block of the firmware image has not the size S, therefore it may be padded using a predefined pattern (e.g. 0x00 or 0xFF) to ease the creation of the block patch.

In a preferred embodiment of the inventive method, a block patch n is temporarily stored in a non-volatile memory area of the embedded device. A block patch n is understood as the difference between an old firmware block of the old firmware image and the corresponding block of the new firmware image, wherein n is a number between 1 and N* of the new firmware blocks; For executing the updating the block patch and the corresponding block of the old firmware image is necessary. A non-volatile memory area for temporary storage of a single updated block can be used as temporary non-volatile storage until a firmware block was written back. By using non-volatile memory area, fail-safety, e.g. updated failure caused by power outage, can be achieved. As seen in FIGS. 3a and 3b the needed memory area for the firmware update can be significantly reduced to the size for storage of the update patch and an area of size S for the block storage.

In another preferred embodiment of the inventive method, the updated block is temporarily stored in a Random Access Memory (RAM). The temporary RAM for an updated block from the old firmware and the corresponding patch can be used as temporary non-volatile storage until the updated firmware block was written back. As seen in FIGS. 3a and 3b the needed memory area for the firmware update can be further reduced to the size for storage of the updated patch by sacrificing the fail-safety. The patch file with the block patches is stored in the flash "update patch" section, wherein the "block storage" section is stored only in RAM and is used to assemble the updated firmware block.

In an embodiment of the inventive method, repetitively creating a block patch n of the new and old firmware image according to step b), with n is a natural number between 1 and N, is performed by matching block n* of the new firmware image against a partially updated old firmware image comprising blocks 1 to M. The algorithm of block patch creation can be performed in such a way that the matching is done against the partially updated firmware image. Meaning for the block patch creation of a block n* of the new firmware image the partially updated old firmware image with for example already updated block 1* to (N−1)* and non-updated blocks m to M from the old firmware image are considered (compared in FIG. 4). This gives the possibility to match new blocks against already updated ones, which might give some binary pattern matches and therefore increases the efficiency of the algorithm.

In another embodiment of the inventive method, repetitively creating a block patch n of the new and old firmware image according to step b), with n is a natural number between 1 and N, is performed by matching a block n* of the new firmware image against the old firmware image in reversed order. The first block patch that is created is for the last block of the new firmware image (block N*). The algorithm continues with preceding blocks (block N−1*, block N−2* . . . ) until the first block of the new firmware image (block 1*) is reached. This option is optimal for growing images, when the new firmware images size is greater than the old firmware image size. If the new firmware image is larger than the old firmware image it is assumed that pattern inside the old firmware image at a position p will be at a position p*>p inside the new firmware image. So, if using an ascending incremental patching the pattern at position p of the old firmware image would be overwritten before reaching position p* of the new updated firmware. Thus, the patch creation algorithm cannot use the pattern of the old firmware image at position p.

In a further embodiment of the inventive method, for tracking the currently processed block patch n a symbol is placed to the blocks of the new firmware image by a linker script. Usually security relevant patches tend to be small code changes and therefore should result only in small changes of the binary content of the image. Unfortunately, the binary layout of the image is heavily dependent on the link order of all related libraries and object files. This order can arbitrarily change and therefore reduce the efficiency of the pattern matching. For example, imagine block M of the old firmware image is moved to the position of block 1* in the new firmware image and everything else is shifted backwards hence the binary difference will still match block M, but everything else cannot be matched anymore because it was not considered for the patch creation. This might be contradictory to the block-based patching algorithm due to its nature of overwriting blocks and therefore not being able to consider old blocks which are already overwritten. This leads to a heavily increased patch size due to the fact, that no pattern matches can be found in the remaining binary content. This can be avoided by placing symbols to the blocks of the new firmware image by a linker script. The linker is responsible to place all symbols (constants, functions, etc.) to a firmware image file. The order of the symbols is determined by the linker (mostly alphabetic order by the symbol name). But it could be that the symbol order is not deterministic. Furthermore, adding a new symbol or renaming will change the symbol order. To control the symbol order the linker script will be used to have a reproducible link order and to put all new/renamed function at a defined place. The linker script can control the order symbols by listing them by name, wild card or namespace etc. For larger projects the linker script should be generated by a helper script. So, one way would be to place each symbol in the same order as it was done in the old firmware image and placing new symbols always at the end or another way would be to group symbols into component libraries and map the libraries into dedicated sections. These two options can maximize the pattern matching within one block and minimize the negative effect of overwriting blocks on pattern matching.

BRIEF DESCRIPTION OF THE DRAWINGS

The disclosure will be explained in more detail using exemplary embodiments.

The appended drawings show

DETAILED DESCRIPTION OF EMBODIMENTS

The old firmware image of the embedded device comprises blocks 1, 2, . . . , m, . . . , M−1, M, wherein m can be every natural number between 1 and M. The new firmware image is divided into N* blocks, hence the new firmware image comprises the blocks 1*, 2*, . . . , n*, . . . , N*−1, N*, wherein n* can be every natural number between 1* and N*. The block size and the position of the blocks of the new and old firmware image are equal. For creating a block patch, and updating the old firmware image a first block 1* of the new firmware image is matched against the full old firmware image of the embedded device by using a binary differential and patching algorithm. So, the first block patch 1 is created by matching said first block 1* of the new firmware image and the blocks 1 to M of the old firmware image. The further block patches 2 to N are created by repeating steps a) matching and b) creating the block patches until all blocks N* and M are processed, respectively, wherein this first option is characterized therein that the consecutive repetitions are performed using only the blocks of the old firmware image that have not been processed yet. Furthermore, it is mandatory that the currently processed block patch n is tracked for ensuring said block patch n in the patch file is not applied twice to an updated part of the old firmware image.

It is advantageous that the old binary firmware image of the embedded device is updated on a block-by-block basis, resulting in block patches 1 . . . n . . . N, wherein n and N are natural numbers, because the memory demand can be reduced and hence the power consumption, and longer battery life times can be achieved, as well as a reduced chip size and lower costs of the embedded device can be realized. The block patches form the resulting patch file.

Figure 1:
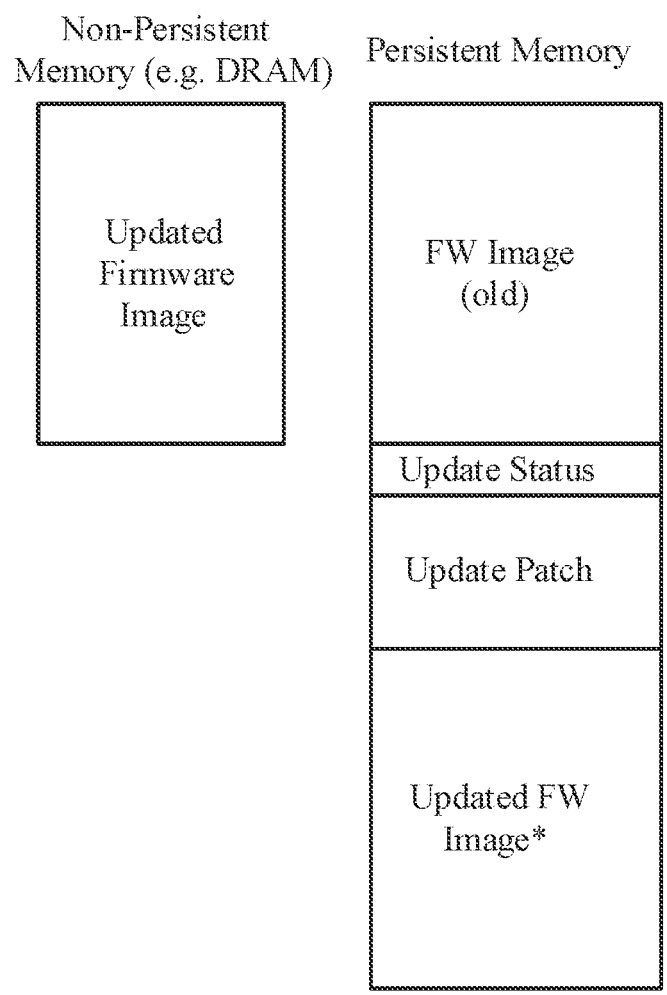
FIG. 1 Procedures for updating a non-persistent memory and a persistent memory in comparison.
Figure 2:
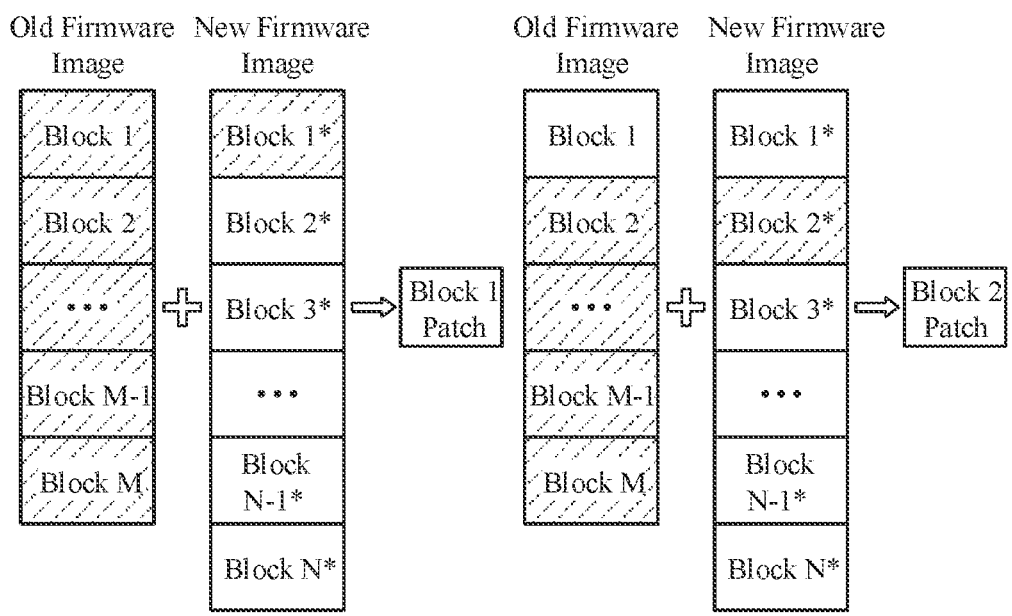
FIG. 2 Inventive method for updating an old firmware image on a block-by-block basis according to a first option.
Figure 3A:
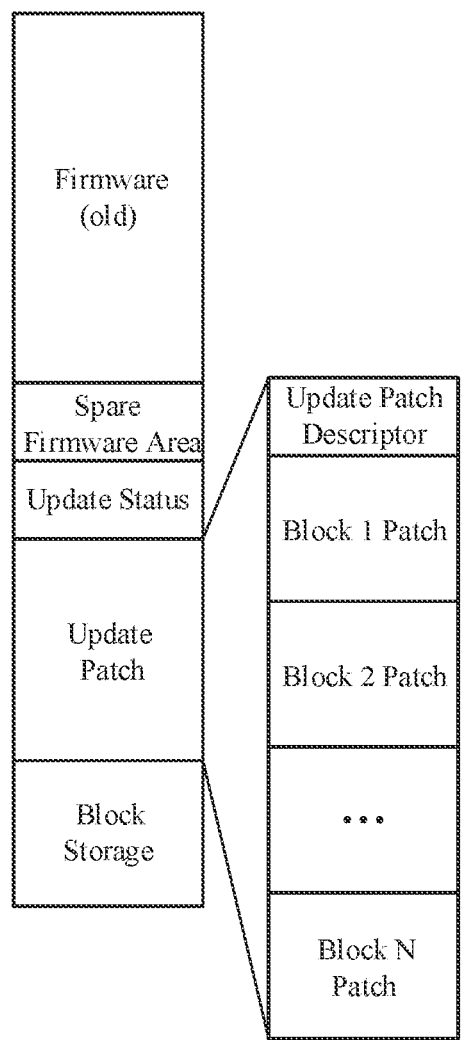
FIG. 3a shows an example of the flash memory layout for fail-safe patching of a firmware by the introduced inventive method.

FIG. 3a shows an example of the flash memory layout for fail-safe patching of a firmware by the introduced inventive method. In the given FIG. 3a the firmware and spare firmware area is the allocated space for the binary firmware image of the embedded device. The update patch area is reserved storage area for the update patch, which contains the update block patches hence parts of the patch file. The update status area is a reserved data area for tracking the application of the block patches to the old firmware. This area can be utilized to track the application of the block patches and avoid duplicate application of a block patch to the same firmware block. The block storage area is reserved flash memory that can be used as scratch area for intermediate storage of a block patch meaning the storage of the currently assembled firmware update block as an updated firmware block in non-volatile memory. The introduction of the block storage area allows fail-safe update of the firmware by writing the updated firmware block from RAM to this block storage area and in a second step writing it to the final new firmware memory block n*. This mechanism allows recovering under all circumstances from any power failure during the update process.

Figure 3B:
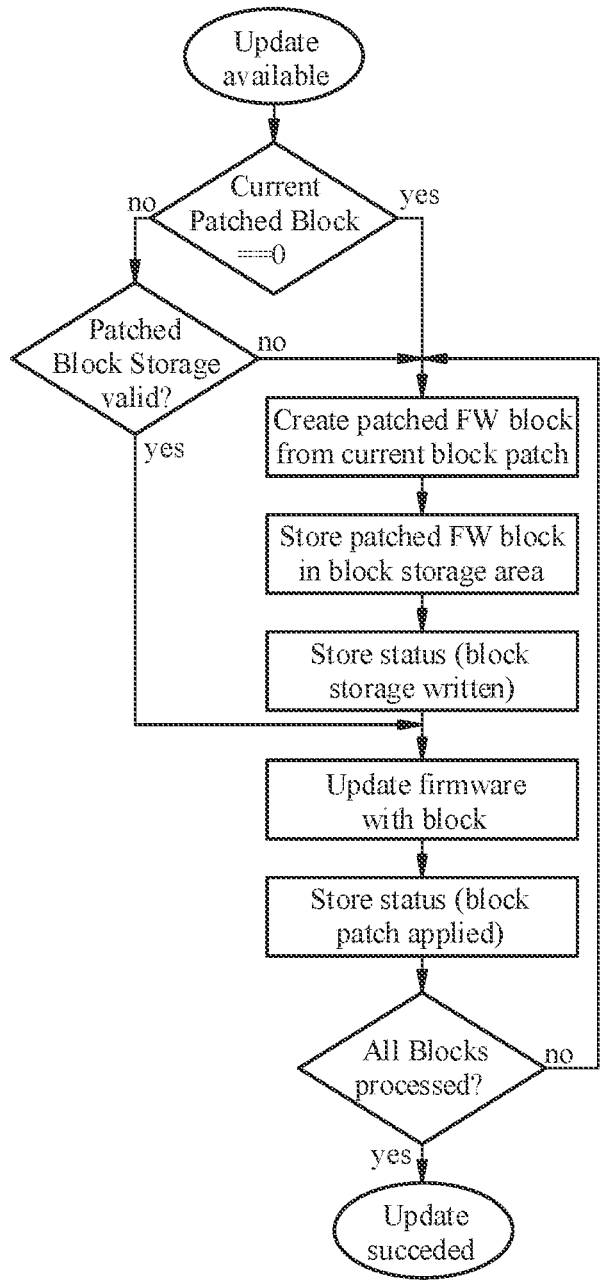
FIG. 3b exemplary describes the process of applying the firmware patch in a fail-safe manner.

FIG. 3b exemplarily describes the process of applying the firmware patch in a fail-safe manner. First it is therefore checked that an update patch is available and the patching was not started ('Current Patched Block==0'). If this is the case an updated block is generated from the old firmware by applying the block patch and written to the block storage area. After that the status of this block storage area is written to be able to detect a valid block storage area in case of power failure during the process. As last step the block is written to its destination in the firmware area and the status of the applied block patch is updated. This is then continued in a loop until all block patches in the patch file are applied. In case of power failure after writing the block storage this can be detected and the process can be continued with updating the firmware area immediately without regenerating the whole patch file. Furthermore, by tracking the application of the applied block patch it is always possible to continue an interrupted update procedure to ensure fail-safe updates.

Figure 4:
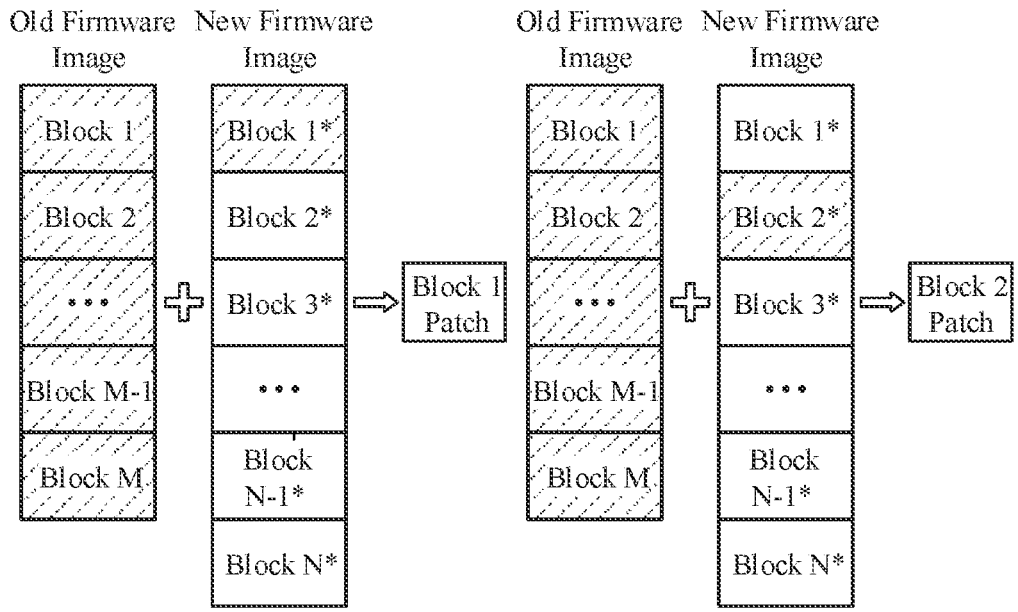
FIG. 4 Inventive method for updating an old firmware image on a block-by-block basis according to a second option.

Another embodiment of the inventive method is shown in FIG. 4. The algorithm of block patch creation can be performed according to a second option in such a way that the matching is done against the partially updated firmware image. For creating the block patch 1, block 1* of the new firmware image is matched against the full old firmware image according to the first option described above. For creating the patch block 2, block 2* of the new firmware image is matched against the old firmware image including the already partially updated block 1*, meaning in general for the patch creation of a block n* of the new firmware image the partially updated old firmware image with for example the already updated block 1* to non-updated blocks 2 to M from the old firmware image is considered. This gives the possibility to match new blocks against already updated ones, which might give some binary pattern matches and therefore increases the efficiency of the algorithm.

Figure 5:
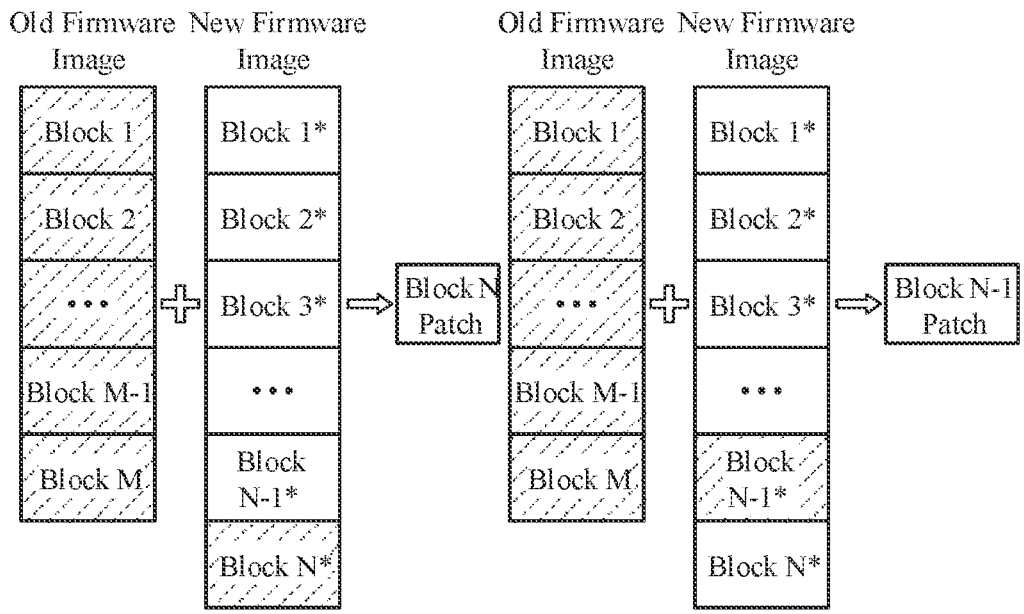
FIG. 5 Inventive method for updating an old firmware image on a block-by-block basis according to a third option.

A further embodiment of the inventive method is shown in FIG. 5. The algorithm of block patch creation according to the second option can be performed in reverse order, resulting in a third option. The first block patch that is created is for the last block of the new firmware image (block N*). The algorithm continues with preceding blocks (block N−1*, block N−2*, . . . ) until the first block of the new firmware image (block 1*) is reached. This third option is optimal for growing images, when the new firmware images size is greater than the old firmware image size. If the new firmware image is larger than the old firmware image it is assumed that pattern inside the old firmware image at a position p will be at a position p*>p inside the new firmware image. So, if using an ascending incremental patching the pattern at position p of the old firmware image would be overwritten before reaching position p* of the new updated firmware. Thus, the patch creation algorithm cannot use the pattern of the old firmware image at position p.

What is claimed is:

1. A method for updating a firmware image of an embedded device, the method comprising:
dividing a new firmware image into blocks 1* . . . n* . . . N* of size S, wherein n* and N* are natural numbers, and wherein the size S corresponds to an erasable block of a flash memory of the embedded device;
considering an old firmware image of the embedded device by dividing the old firmware image into blocks 1 . . . m . . . M of size S, wherein m and M are natural numbers;
a) matching the block n* of the new firmware image against the blocks n to M of the old firmware image using a binary differential and patching algorithm;
b) creating a block patch n of the new firmware image and old firmware image according to the block n* of the new firmware image and the blocks n to M of the old firmware image and storing the block patch n in a patch file;
creating block patches 1 to N by repeating steps a) and b) until all the blocks N* and M are processed, respectively; and
updating the old firmware image of the embedded device on a block-by-block basis, by using the corresponding block patch 1 . . . n . . . N, wherein n and N are natural numbers, and wherein a currently processed block patch n is tracked for ensuring said block patch n is not applied twice to an updated part of the old firmware image.

2. The method for updating a firmware image of an embedded device according to claim 1, wherein an updated block n according to the block patch n is stored in place corresponding to the block m of the old firmware image of the embedded device.

3. The method for updating a firmware image of an embedded device according to claim 2, wherein the updated block is temporarily stored in a Random Access Memory storage.

4. The method for updating a firmware image of an embedded device according to claim 2, wherein repetitively creating a patch block n of the new and old firmware image according to step b), with n being a natural number between 1 and N, is performed by matching the block n* of the new firmware image against the old firmware image in reversed order.

5. The method for updating a firmware image of an embedded device according to claim 2, wherein if the last block N* of the new firmware image has another size than size S, said last block N* is padded with 0x00 or 0xFF.

6. The method for updating a firmware image of an embedded device according to claim 5, wherein repetitively creating a patch block n of the new and old firmware image according to step b), with n being a natural number between 1 and N, is performed by matching the block n* of the new firmware image against the old firmware image in reversed order.

7. The method for updating a firmware image of an embedded device according to claim 1, wherein the size S of the block n* of the new firmware image is an integer multiple of a memory page size, wherein n* is a natural number between 1 and N*.

8. The method for updating a firmware image of an embedded device according to claim 1, wherein if the last block N* of the new firmware image has another size than size S, said last block N* is padded with 0x00 or 0xFF.

9. The method for updating a firmware image of an embedded device according to claim 1, wherein a block patch n is temporarily stored in a non-volatile memory area of the embedded device.

10. The method for updating a firmware image of an embedded device according to claim 1, wherein the updated block is temporarily stored in a Random Access Memory storage.

11. The method for updating a firmware image of an embedded device according to claim 1, wherein repetitively creating a patch block n of the new and old firmware image according to step b), with n being a natural number between 1 and N, is performed by matching the block n* of the new firmware image against a partially updated old firmware image comprising blocks 1 to M.

12. The method for updating a firmware image of an embedded device according to claim 1, wherein repetitively creating a patch block n of the new and old firmware image according to step b), with n being a natural number between 1 and N, is performed by matching the block n* of the new firmware image against the old firmware image in reversed order.

13. The method for updating a firmware image of an embedded device according to claim 1, wherein for tracking the currently processed patch block n a symbol is placed to the blocks of the new firmware image by a linker script.

14. The method for updating a firmware image of an embedded device according to claim 1, wherein each of the block patches 1 to N comprises a difference of the matched blocks of the new and old firmware images.

* * * * *